US009778629B2

United States Patent
Venayagamoorthy

(10) Patent No.: US 9,778,629 B2
(45) Date of Patent: Oct. 3, 2017

(54) SITUATIONAL AWARENESS / SITUATIONAL INTELLIGENCE SYSTEM AND METHOD FOR ANALYZING, MONITORING, PREDICTING AND CONTROLLING ELECTRIC POWER SYSTEMS

(71) Applicant: Clemson University, Clemson, SC (US)

(72) Inventor: Ganesh Kumar Venayagamoorthy, Clemson, SC (US)

(73) Assignee: Clemson University, Clemson, SC (US)

( * ) Notice: Subject to any disclaimer, the term of this patent is extended or adjusted under 35 U.S.C. 154(b) by 453 days.

(21) Appl. No.: 14/088,984

(22) Filed: Nov. 25, 2013

(65) Prior Publication Data
US 2014/0148962 A1    May 29, 2014

Related U.S. Application Data

(60) Provisional application No. 61/730,578, filed on Nov. 28, 2012.

(51) Int. Cl.
*G05B 13/04* (2006.01)
*H02J 3/00* (2006.01)
*H02J 13/00* (2006.01)

(52) U.S. Cl.
CPC .............. *G05B 13/048* (2013.01); *H02J 3/00* (2013.01); *H02J 13/0006* (2013.01);
(Continued)

(58) Field of Classification Search
CPC ...... G05B 13/048; H02J 13/0006; H02J 3/00; H02J 2003/007; Y02E 60/74;
(Continued)

(56) References Cited

U.S. PATENT DOCUMENTS

| | | | |
|---|---|---|---|
| 5,140,670 A * | 8/1992 | Chua | G06N 3/0635 706/20 |
| 2002/0087221 A1* | 7/2002 | Keeler | G05B 13/027 700/48 |
| 2007/0096747 A1* | 5/2007 | Wells | G01R 23/04 324/520 |

(Continued)

OTHER PUBLICATIONS

G. Kumar Venayagamorrthy, PHD; Methods and Systems for Real-Time Situational Awareness (SA)/Situational Intelligence (SI) System for Electric Power Control Centers; A Presentation to the Intellectual Property Committee at Clemson University; Clemson, SC; Aug. 7, 2012.

(Continued)

*Primary Examiner* — Sean Shechtman
*Assistant Examiner* — David Wynne
(74) *Attorney, Agent, or Firm* — John R. Perkins, Jr.; Perkins Law Firm, LLC

(57) ABSTRACT

A system and method for modeling, controlling and analyzing electrical grids for use by control room operators and automatic control provides a multi-dimensional, multi-layer cellular computational network (CCN) comprising an information layer; a knowledge layer; a decision-making layer; and an action layer; wherein each said layer of said CCN represents one of a variable in an electric power system. Situational awareness/situational intelligence is provided therefrom so that the operators and grid control systems can make the correct decision and take informed actions under difficult circumstances to maintain a high degree of grid integrity and reliability by analyzing multiple variables within a volume of time and space to provide an understanding of their meaning and predict their states in the near future where these multiple variables can have different timescales.

23 Claims, 9 Drawing Sheets

(52) U.S. Cl.
CPC ....... *H02J 2003/007* (2013.01); *Y02E 60/728* (2013.01); *Y02E 60/74* (2013.01); *Y02E 60/76* (2013.01); *Y04S 10/265* (2013.01); *Y04S 10/30* (2013.01); *Y04S 40/22* (2013.01)

(58) Field of Classification Search
CPC ....... Y02E 60/728; Y02E 60/76; Y02B 60/50; Y04S 40/22; Y04S 10/265; Y04S 10/30
See application file for complete search history.

(56) References Cited

U.S. PATENT DOCUMENTS

| | | | | |
|---|---|---|---|---|
| 2011/0282508 A1* | 11/2011 | Goutard | ............... | H04L 63/20 700/293 |
| 2012/0179301 A1* | 7/2012 | Aivaliotis | ............... | H02J 3/00 700/286 |
| 2013/0060553 A1* | 3/2013 | Patel | ............... | H04L 41/145 703/18 |

OTHER PUBLICATIONS

Ganesh Kumar Venayagamoorthy; Clemson University; Confidential Intellectual Property Disclosure Form; "Situational Awareness (SA) System for Electric Power Systems"; Jun. 28, 2002.

Ganesh Kumar Venayagamoorthy; Clemson University; Confidential Intellectual Property Disclosure Form; Dynamic Stochastic Smart Grid Optimization (DSSGO); Oct. 2, 2012.

Ganesh K. Venayagamoorthy;Ronald Harley; Information About Principal Investigators/Project Directors(PI/PD) and co-Principal Investigators/co-Project Directors; Proposal to The National Science Foundation; Feb. 7, 2012.

Bipul Luitel; Ganesh Kumar Venayagamoorthy; "Decentralized Asynchronous Learning in Cellular Neural Networks"; IEEE Transactions on Neural Networks and Learning Systems, vol. 23, No. 11; Nov. 2012.

Karthikeyan Balasubramaniam; Bipul Luitel and Ganesh Kumar Venayagamoorthy; "A Scalable Wide Area Monitoring System using Cellular Neural Networks"; WCCI 2012 IEEE World Congress on Computational Intellegicence, Jun. 10-15, 2012, Brisbane, Australia.

Ganesh K. Venayagamoorthy; Computational Approaches for Bad Data Handling in Power Systems Synchrophasor Networks; Preprints of the 19$^{th}$ World Congress; The International Federation of Automatic Control, Cape Town, South Africa; Aug. 24-29, 2014.

* cited by examiner

SITUATIONAL AWARENESS / SITUATIONAL INTELLIGENCE SYSTEM AND METHOD FOR ANALYZING, MONITORING, PREDICTING AND CONTROLLING ELECTRIC POWER SYSTEMS

STATEMENT OF GOVERNMENT SUPPORT

This invention was made with government support under grants #1238097, #1231820, #1232070, #1312260, and #1408141 awarded by The National Science Foundation. The government has certain rights in the invention.

BACKGROUND OF THE INVENTION

The invention relates to an electrical grid monitoring, prediction, analysis, and control system and, more particularly, to an improved system and method for grid control using a multi-dimensional multi-layered cellular computational network (CCN) to provide a situational awareness (SA)/situational intelligence (SI) framework. CCNs can model/replicate complex dynamical systems, and thus can be rich in dynamics. The invention uses this SA/SI framework to provide a perception of environmental elements within a volume of time and space, an understanding of their meaning, and an estimation of their current states and prediction in the near future.

Situational awareness is critical and important to control center/room operators for secure, reliable and efficient power system and smart grid operation. Despite the importance of analytical methods, continuous data sense-making is critical for ensuring the stability and security of the power system. SA/SI systems provide an understanding of the spatial and temporal dynamics of an interconnected and geographical distributed power system.

Current grid control predictive systems are slow to react and often fail to take all-important variables into account when modeling specific actions or outcomes. Data is provided from a multitude of sources in real-time or at near-real-time speeds. The problem is not generally the amount of data available to operators. The problem is more often how that data is analyzed and used to inform operators. In other words, more data and/or information does not necessarily matter in critical operations. What is important is that the data is properly analyzed and prioritized to provide useful information, knowledge and understanding of critical issues (circumstances/conditions) to the operator in a respective time and space (network region).

It is also critical that the operator have a full understanding of the electric grid's connectivity with neighboring systems at a given time and space because the grid, at least in the United States, is a highly interconnected system. This means that the dynamics of each part of the grid are spatially and temporally connected/coupled.

Typically, when a disturbance in the grid occurs, the system operator in the control center of an electricity utility is thinking one or more of the following thoughts and looking for immediate answers to inform his/her next action(s).

1. Have I received a new alert?
2. Is any system limit in violation?
3. If so, how bad is the violation?
4. Where is the problem location?
5. What is the cause?
6. Is there any possible immediate corrective or mitigative action?
7. If yes, what is that action?
8. Can or should the action be immediately implemented or can it wait?
9. Has the problem been addressed?
10. Is there any follow up action needed?

Answers to these questions can only be achieved with greater awareness and intelligence, respectively, in control rooms and control centers. Field data must be converted to information and knowledge, then routed to appropriate control centers and operators. Again, the problem is not data acquisition because current supervisory control and data acquisition (SCADA) systems are able to receive data at fast rates (typically 4 to 5 seconds). The problem is big data analytics for smart grid where there is high volume of different types (voltages, active and reactive powers, speed deviations of generators, frequency, etc.) of data streaming at very fast speed (from phasor measurement units (PMUs) at 30 Hz to 120 Hz). The problem is how that big data is processed in real-time, or even faster than real-time, to inform the operator, especially of near-future-state predictions and projections, also known as situational intelligence, to take appropriate secure, reliable and efficient actions. An SA/SI system and method, properly implemented, would have the ability to address these issues. In other words, the actionable information is critical to understand future control states for the system. The invention does this by helping operators to understand these states creating a predictive state model for individual electrical devices and the electrical grid overall.

What is needed is a system that can address these concerns and questions in a holistic manner, keeping in context the fact that local regions of the grid are viewed microscopically, while the grid overall is viewed macroscopically. The system must provide SA/SI for operators in control rooms and control centers so that the operators can make the correct decision under difficult circumstances to maintain a high degree of grid integrity and reliability.

What is needed is a system that can use SA/SI to properly analyze multiple system and control state variables within a volume of time and space to provide an understanding of their meaning and predict their states in the near future where these multiple variables can have different timescales.

What is also needed is a system that can integrate historical and real-time data to implement near-future SA and SI, where intelligence (near-future) is a function of history, current state, and predicted state. Such a system should be able to predict security and stability limits such as, but not limited to, real-time operating conditions, dynamic models, forecast load, forecast generation, and contingency analyses.

What is further needed is a system that provides advanced visualization to integrate all applications as well as topology updates and geographical influences. These visualizations should be in real-time or even "faster than real-time" to provide situational awareness and situational intelligence of power system operations in advance within a virtual power system.

SUMMARY OF THE INVENTION

The foregoing objects have been achieved in the present invention, whereby the present invention overcomes the above identified and other deficiencies in conventional grid operation systems and methods and in grid analysis and control systems.

The system provides SA/SI for operators in control rooms and control centers so that the operators can make the correct decision under difficult circumstances to maintain a high degree of grid integrity and reliability.

The system provides SA/SI for operators in control rooms and control centers so that the operators can make the correct decision under difficult circumstances to maintain a high degree of grid integrity and reliability. Moreover, the system provides answers to operators in a holistic manner, keeping in context the fact that local regions of the grid are viewed microscopically, while the grid overall is viewed macroscopically.

The system also provides SA/SI to properly analyze multiple variables within a volume of time and space to provide an understanding of their meaning and predict their states in the near future where these multiple variables can have different timescales.

The system further provides a means to integrate historical and real-time data to implement near-future SA and SI, where intelligence (near-future) is a function of history, current status, and predictions. The system is able to predict security and stability limits such as, but not limited to, real-time operating conditions, dynamic models, forecast load, forecast generation, and contingency analyses.

The system also provides advanced visualization to integrate all applications as well as topology updates and geographical influences. These visualizations should be in real-time or even "faster than real-time" to provide situational awareness of power system operations in advance within a virtual power system.

The system provides improved modeling and decision making in an electrical grid control system comprising a multi-dimensional multi-layer CCN comprising an information layer; a knowledge layer; a decision-making layer; and an action layer; wherein each said layer of said CCN represents one of a variable in an electric power system.

More specifically, the system provides an electrical grid monitoring, predictive monitoring, and control system comprising: a controller in electrical communication with a multiplicity of electrical devices in an electric grid, wherein said controller receives control state data from each electrical device of said multiplicity of electrical devices indicating a current state of each said electrical device; a multi-dimensional, multi-layer CCN disposed within said controller comprising: an information layer; a knowledge layer; a decision-making layer; and an action layer; wherein each said layer of said CCN represents one of a multiplicity of control state variables in the electric grid; wherein said controller analyzes said multiplicity of control state data then determines a current control state and a predicted control state for one or more of said multiplicity of electrical devices.

The system is also capable creating a current control state model and a predicted control state model to indicate the current state and predicted future state of said one or more of said multiplicity of electrical devices. The system is further capable of creating a current control state model and a predicted control state model to indicate the current state and predicted future state of said electrical grid. The system may also indicate a recommended action defining a course of action for future control of said electrical grid and transmit that control information based upon said recommended action to one or more of said multiplicity of electrical devices thereby causing a change in the state of said one or more of said multiplicity of electrical devices.

One embodiment of the system can calculate a stress of said electrical grid. The stress can then be used to calculate a predicted state model to indicate a predicted future state of said electrical grid. It can also be used as a dynamic predictive state estimation model to allow for improved detection, identification and removal of bad measurements from sensors such as phasor measurement units. It can also be used to create real-time indicators and predictive security indicators.

The invention further comprises a method of controlling an electrical grid in a situational awareness/situational intelligence framework comprising the steps of: receiving control state information from at least one of a multiplicity of electrical devices disposed within an electrical grid; analyzing said control state information in said controller using an multi-dimensional, multi-layer CCN disposed within said controller comprising: an information layer; a knowledge layer; a decision-making layer; and an action layer; wherein each said layer of said CCN represents one of a control state variable of a multiplicity of control state variables in said electric grid; and creating a predicted control state for at least one of said multiplicity of electrical devices.

This method may also include the step of creating a predicted state model to indicate the future state of said one or more of said multiplicity of electrical devices. It may also include the step of creating a predicted state model to indicate the future state of the electrical grid. It may also include the step of creating a recommended action for use in selecting a course of action for future control of the electrical grid. It may also include the step of sending updated control state information to one or more of said multiplicity of electrical devices for the purpose of causing a change in the state of said one or more of said multiplicity of electrical devices. And it may also include the step of lowering the number of phasor measurement units disposed within the electrical grid without degrading said controller's ability to provide full observability of the electrical grid. It may also include the step of creating virtual phasor measurement units with the standard and advanced data/information capabilities.

The invention further comprises an electrical grid monitoring and control system containing a situational awareness/situational intelligence framework comprising: a controller in electrical communication with a multiplicity of electrical devices in an electrical grid, wherein said controller receives control state information from at least one electrical device in said multiplicity of electrical devices indicating a current state of said at least one electrical device; a multi-dimensional, multi-layer CCN disposed within said controller comprising: an information layer; a knowledge layer; a decision-making layer; and an action layer; wherein each said layer of said CCN represents one of a control state variable of a multiplicity of control state variables in said electric grid; and wherein each said layer is further comprised of a multiplicity of cells each containing computational algorithms capable of cognitive learning to create a control state model by receiving cellular control state information from another cell; and wherein said controller analyzes said control state information and said cognitive learning within one or more of said multiplicity of cells, then determines a current control state and a predicted control state for one or more of said multiplicity of electrical devices.

The system of this embodiment may also comprise a CCN capable of coupling one or more of said layers to create a predicted state model to indicate said predicted control state of said one or more of said multiplicity of electrical devices. The CCN is also capable of coupling one or more of said layers to create a predicted state model to indicate said predicted control state of said electrical grid.

The controller may also calculate the stress of the electrical grid to create a current state model and a predicted state model to indicate said current control state and said predicted control state of said electrical grid, wherein said electrical grid comprises renewable generation devices.

DETAILED DESCRIPTION OF THE PREFERRED EMBODIMENTS

Figure 1:
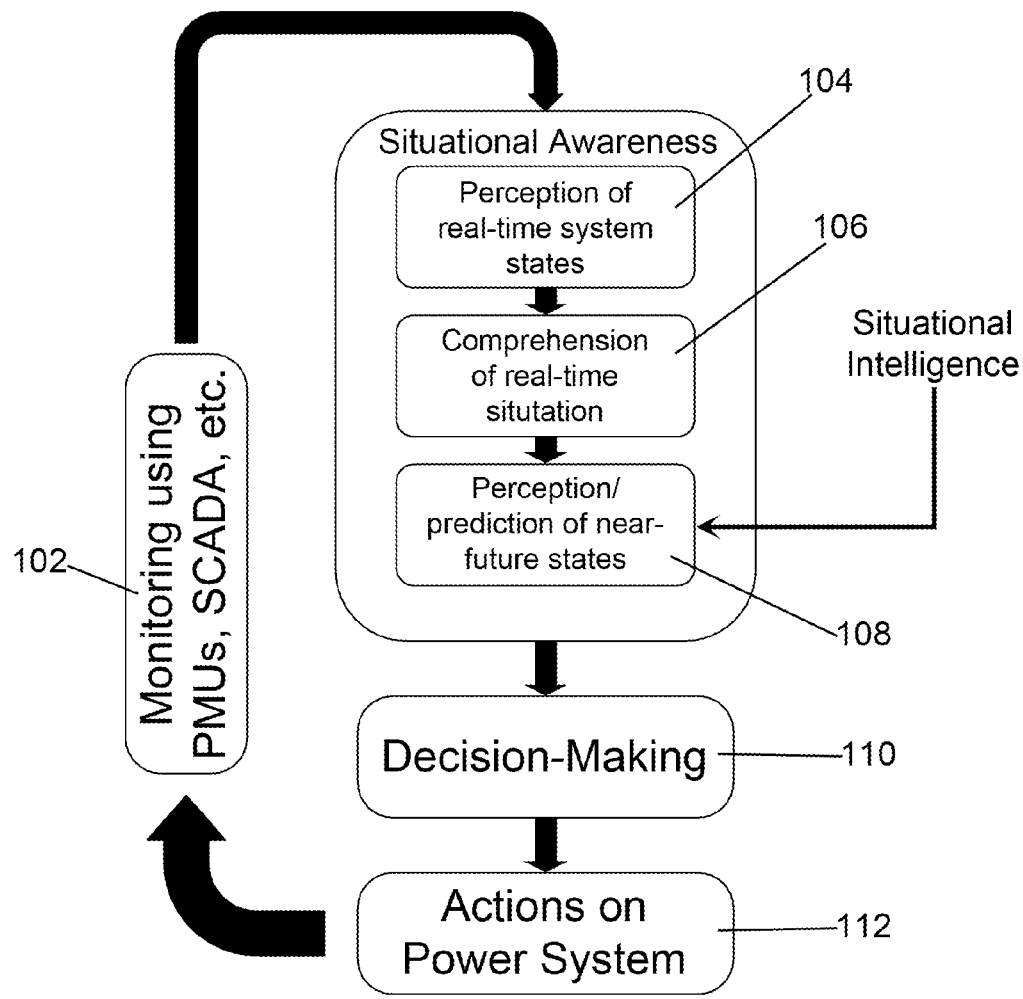
FIG. 1 is a flow chart illustrating a method of using an embodiment of the invention.

The invention is perhaps better understood with reference to the attached drawings. An SA/SI system and method, properly implemented, would have the ability to address the above deficiencies in the prior art as further illustrated in FIG. 1, which illustrates how SA/SI arrives at actionable information and ensures that a power system is operating in a secure, reliable and efficient control state. Flow chart 100 provides an overview of the process.

A multiplicity of electrical devices disposed within an electrical grid feed control state information at 102. Each electrical device in the electrical grid is equipped with some form of measurement unit capable of monitoring the state of the electrical device and delivering such control state information back to a controller, so the control state information typically comes from monitoring and measuring units such as PMUs, SCADA, AMI, etc.

Situational awareness begins at step 104 where a controller receives/perceives the real-time control state/system state information. The controller then begins to analyze the real-time information at 106, wherein a real-time (current) control state model may be created. The combination of steps 104 and 106 provide situational awareness (SA) for the system. The controller goes further at step 108 when it creates a predicted control state model to predict future and near-future states of the electrical grid and the electrical devices contained therein. This step 108 comprises the situational intelligence (SI) element of the system.

Once SA/SI is established, the above information is available for decision making at step 110. Such decision-making may involve making the near-future state model available to control room operators to improve their decision-making, or using that information to make changes automatically in the electrical grid. It could also involve making recommendations or providing guidelines for system operators and automatic control systems. In all events, actions are generally taken thereafter in step 112 to cause a change in the state of one or more electrical devices in the electrical grid. This change in state may involve, among other things, opening or closing a switch, increasing or decreasing output in a generation device, or altering the real- or active-power output of control devices in the grid.

Figure 2:
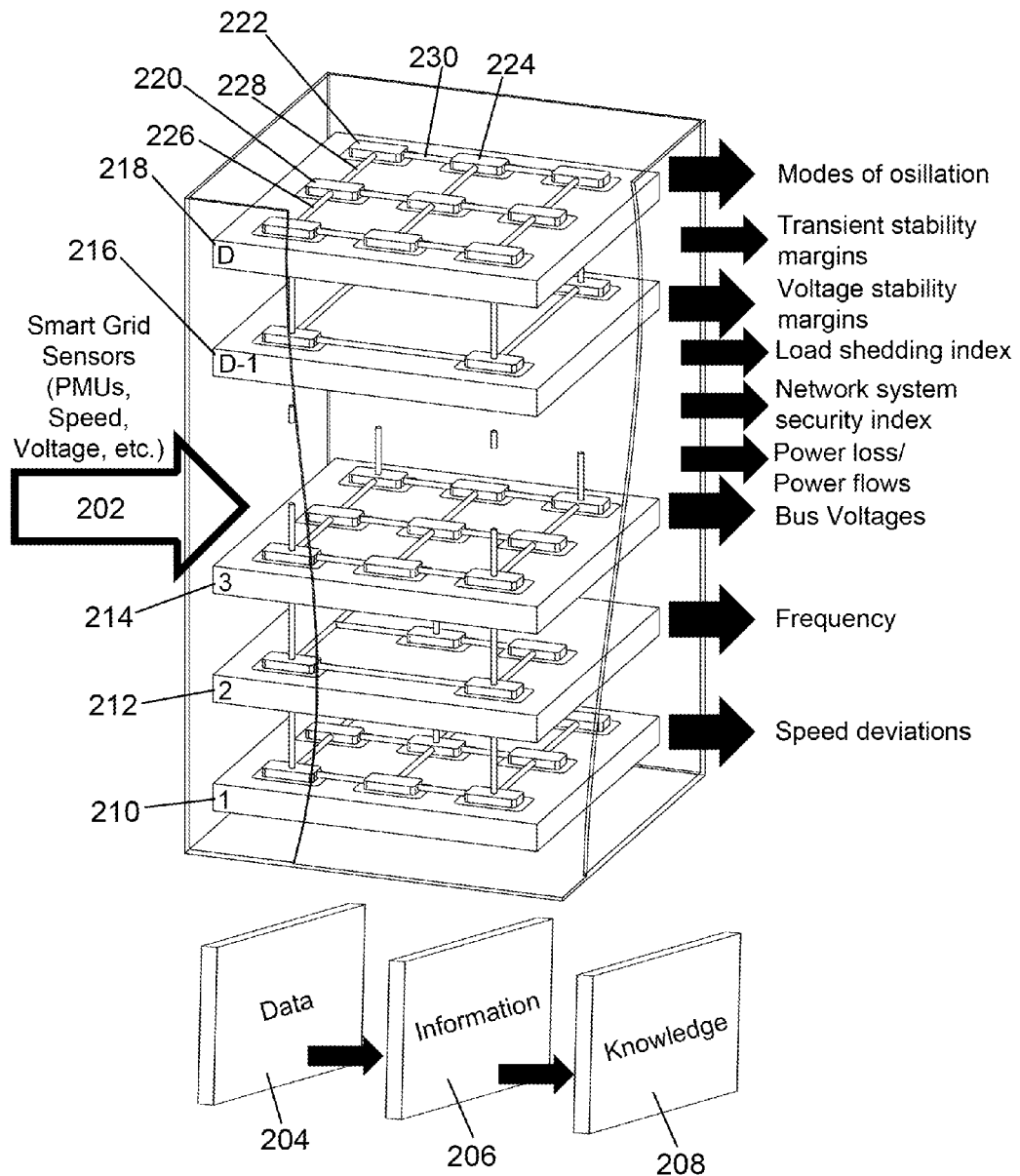
FIG. 2 is a pictographic representation of an N-dimensional, D-layer CCN as used in an embodiment of the invention.

The above system and method is explained in further detail with reference to FIG. 2. An embodiment of the invention comprises a grid operation system and controller that provides a SA/SI framework in an N-dimensional, D-layered CCN (CCN), also sometimes known as a multi-dimensional, multi-layered cellular neural network, when the cells contain neural networks. Within the CCN, each layer represents one variable of the power system, e.g., voltage at a bus. A preferred embodiment of the invention comprises different layers of the CCN for SA/SI in the form of at least information layers, knowledge layers, decision-making layers, and action layers. This approach provides a modular, parallel, and scalable solution to achieve the foregoing objectives as shown in FIG. 2 in an N-dimensional, D-layered CCN 200.

Different types of data (each a control state) received from different types of measurement units 202 (also sometimes called sensors), such as phasor measurement units (PMUs), in various electrical devices found in the electrical grid, are used as inputs to the SA/SI system. CCN 200 provides a scalable technology to allow integration of these different types of data and information to infer and predict new information for knowledge retrieval. Layers may comprise data 204, information 206, and knowledge 208, as well as D-layers 210, 212, 214, 216, and 218 which represent various electrical grid variables from 1 to D, such as speed deviations, frequency, and bus voltages.

The combination of layers form a cellular network comprised of individual cells, where each cell is connected within the network so as to provide feedback and cognitive learning. CCN 200 is illustrated with multiple D-layers each consisting of 3×3 groups of cells, so that CCN 200 is illustrated as 9-dimensional (see also FIG. 6 for more on this concept). Cells 220, 222, and 224, for example, are integrated through interconnections 226, 228, and 230.

CCN 200 provides a modular approach to allow intelligent sense-making, decision-making, and adaptive (control) layers to be added and integrated. Inputs and outputs from CCN 200 are nearly infinite and may comprise the illustrated modes of oscillation, transient stability margins, voltage stability margins, load shredding index, network system security index, power loss, power flows, bus voltages, frequency, and speed deviations.

Figure 3:
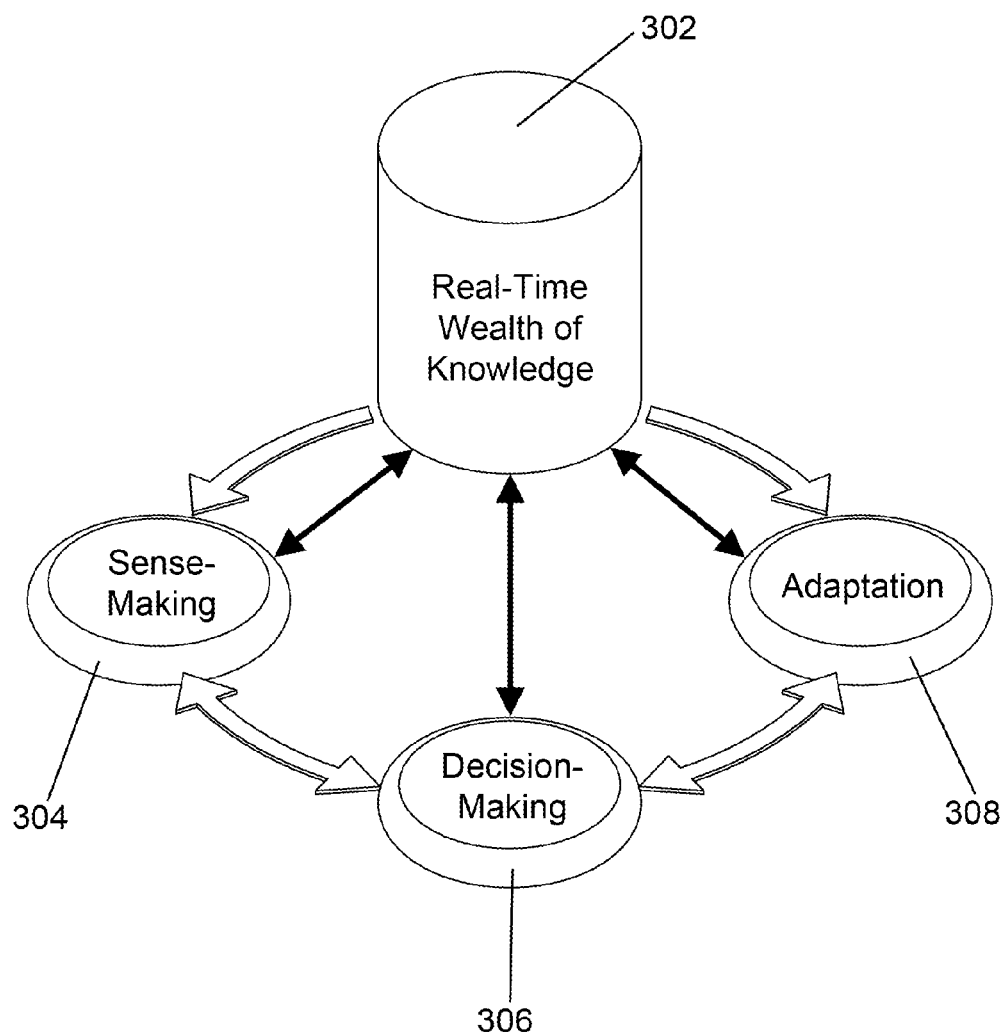
FIG. 3 is a graphical representation of data flow in a CCN as used in an embodiment of the invention.

As further illustrated in FIG. 3, the layers of a CCN consist of a real-time wealth of knowledge 302. Here an electrical grid is feeding data into the real-time wealth of knowledge and the adaptation is dispatching signals to the grid. This is possible through intelligent sense-making 304, which is embedded in the CCN dynamics. Additional layers, such as decision-making 306 and adaptation 308, can be stacked to the CCN to allow for optimal decisions and evolution of actionable information. A CCN consisting of all such layers may be referred to as a computational system-thinking machine.

In this way the benefits of using an SA/SI approach can be seen. A CCN architecture allows for creation and integration of many applications using synchrophasor or other data, and visualization using improved graphical user interface based on phase angle difference and voltage data, phase plane, security monitoring, and risk indices. It also allows online identification of events by location, time, size, and type. Early warning of stability problems usually comes in the form of real-time data that is used to assess local and system-wide stability.

In transmissions systems, the invention provides dynamic model validation and online modeling of system load. Load modeling is accomplished to create virtual real-time loads from real-time signal analysis and other inputs. Voltage stability assessments are made with synchrophasor data and current real-time models. Transmission system "stress" is calculated using phase voltage and current phase angles along with other inputs. A state estimation model is created using the same information, which also allows for improved detection of faulty PMU data—often as high as 17%. And finally, real-time security indicators (nomograms) can be created using all the above data.

The invention provides the further benefit of allowing for reduction of the number of PMUs, or other measurement units, to be placed in a transmission network for full observability. PMUs can be placed for a certain depth of unobservability and the unobserved buses can be observed using the CCN outputs. For unobserved buses with loads, the CCN is capable of estimating the load to provide full observability of the network.

The invention is particularly useful in new alternative and renewable energy applications, such as wind and solar generation. Voltage fluctuation is a primary concern in all forms of renewable energy generation, especially with regards to power network integration. The invention provides substantially improved and faster voltage sensitivity and small signal analysis, where low frequency oscillations and damping rates are estimated/predicted. Improved forecasting is achieved to provide a renewable "stress" indicator unique to renewable generation plants. The separate stress to the grid introduced by renewable generation is accounted for and then used to create a near-real-time model and forecast. In this way, improved demand response can be achieved to improve grid stability and reliability.

More specifically, the CCN provides a framework for decentralized asynchronous learning (DAL) in N-dimensions and D-layers, as shown in FIG. 2. These D-layers include power system control state variables—such as line power flows, generator active powers, speed deviations, and bus voltages—to be monitored to achieve a dynamic stochastic optimization (DSO) function in real-time for the power system operation. The decentralized nature of the framework developed addresses scalability and the high speed needed to implement real-time adaptive wide area monitoring, also known as situational intelligence, and control. The decentralized nature of the architecture allows each cell to carry out incremental learning at its own pace and when required.

As shown in FIG. 2, a 'cell' (such as 220, 222, or 224) is a computational unit performing a specific task. Any kind of computational algorithm can be in a cell. This may be, for example, recurrent neural networks (RNNs) or recurrent generalized neurons (GRNs). There are both cognitive and 'social' aspects of learning in DAL. Cognitive (within the cell) learning takes place when parameters affecting the cell are changed and the cell has to update itself to reflect this change. This acquired knowledge is then transmitted to neighboring cells via local interconnection between cells (such as 226, 228, or 230) and they learn system changes through the information that is passed on.

The CCN exhibits two types of learning, namely local learning and global learning. Local learning is in the cells and within a neighborhood of cells. Global learning emerges via local learning through the active interconnections between neighborhoods of cells. Each layer of the CCN could be modeled to predict a specific variable of the power system such as the system bus voltages.

More specifically, as shown in FIG. 2, each cell in a layer of CCN 200 is modeled to represent a specific power system component; for example, each cell in voltage prediction layer 214 of FIG. 2 (layer 3) represents a bus and estimates/predicts voltage at that particular bus. Spatial dynamics of a power system are captured by distribution of cells as each cell represents a component, for example a bus, and cells are connected in a manner similar to actual power system topology or connectivity between the power system components.

Temporal dynamics of the system (components) are captured depending on the computational algorithm embedded in each cell and spatial connectivity between the cells. For example, a RNN in a cell, due to its dynamic memory, can capture the rotor dynamics of a generator connected to an infinite bus/rest of the power system/equivalent equivalent. Layers are coupled with each other in specific ways to represent coupling that exists in an actual power system. In asynchronous incremental learning, a cell that has for example an absolute relative error (ARE) above a prescribed threshold will change its weights/parameters to learn/adapt. Learning/adaptation continues until the ARE drops below the threshold or a certain termination condition is met.

Figure 4:
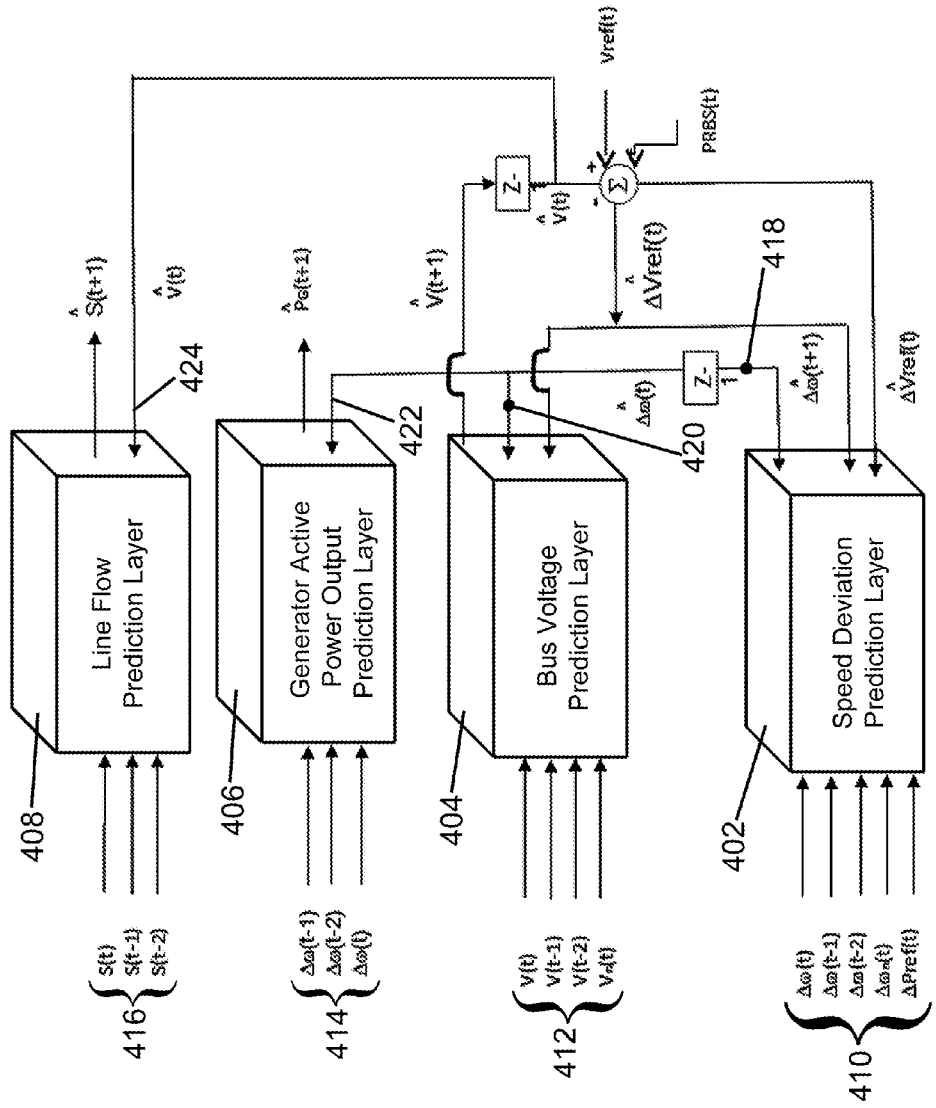
FIG. 4 is a pictographic representation of 4 layers in a CCN as used in an embodiment of the invention.

An example of the interconnection concept between layers is depicted in FIG. 4 illustrating a preferred coupling between four layers—generator speed deviation 402, voltage prediction 404, generator active power output 406, and line flows and losses 408—in a CCN performing a step-ahead prediction. Here, each layer receives a respective set of control state inputs 410, 412, 414, and 416 from electrical devices in the grid, along with data from interconnections 418, 420, 422, and 424 between the various layers.

The invention also exploits the spatial characteristics of a CCN to map/capture the power system topology one-to-one into the CCN structure for each layer. For example, as shown alternatively in FIGS. 5(a) and 5(b), the bus voltage layer of a 12-bus power system 500 is depicted, where one bus is an infinite bus, and the eleven CCN cells marked as Bus 1 to Bus 11 form CCN layer 214 from FIG. 2. The connections to each cell are mirrored from the physical topology of the power system 500 so that this approach is scalable to any-sized power system.

In this way an embodiment of the invention allows for improved forecasting/prediction accuracy of wind farm power outputs (real/active and reactive powers), and is scalable to a wind farm/park with large number of wind turbine units. The topology of the wind farm can be captured in CCN layer(s). The spatial and temporal influence of neighboring wind turbine units on a given unit can be captured/modeled resulting in better forecasting accuracies. The same is true for solar farms using photovoltaic and other solar farm technologies.

A cellular neural network (CNN) is a special case of CCN, which is itself a high-dimensional, dynamic nonlinear circuit/architecture composed of locally coupled, spatially recurrent circuit units called cells. The resulting network may have any architecture including, without limitation, rectangular, hexagonal, toroidal, spherical, and the like.

Figure 6:
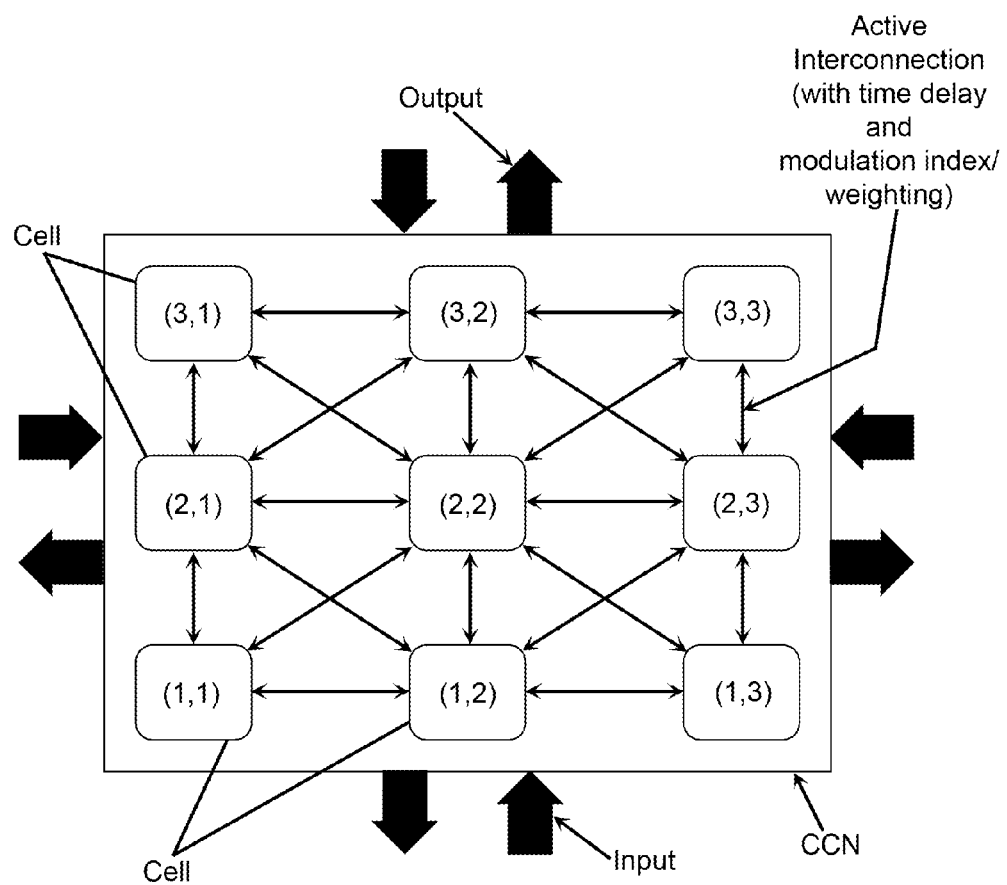
FIG. 6 is a 9-dimensional CCN layer representing the various control state information associated with multiple electrical devices in an electrical power system that can be modeled and controlled by a CCN as used in an embodiment of the invention.

A rectangular CCN 600 with a neighborhood size of 3×3 is depicted in FIG. 6. This is a single-layer CCN with 9 cells (3×3 cells) where each cell has a single output so that the CCN has 9-dimensions/outputs overall. In other words, example 600 of an N-Dimensional, D-layered CCN is actually a 9 dimensional, 1 layered CCN.

Figure 5A:
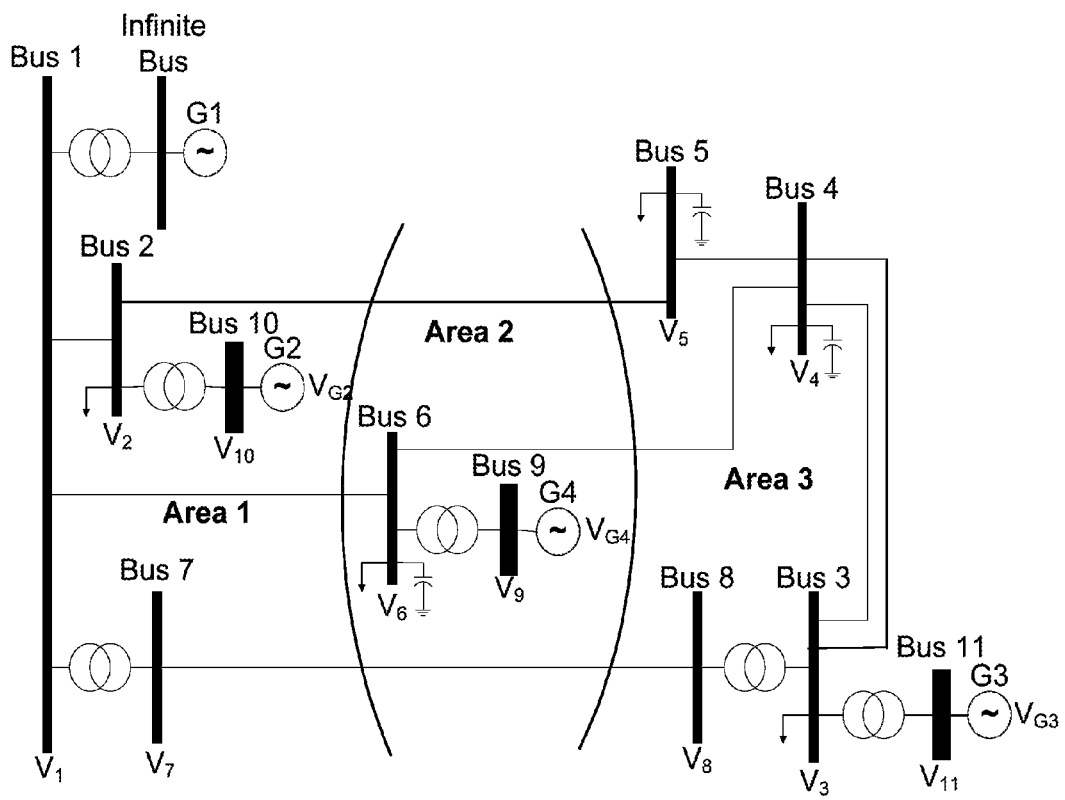
FIG. 5a is a schematic of an electrical power system as used in an embodiment of the invention.
Figure 5B:
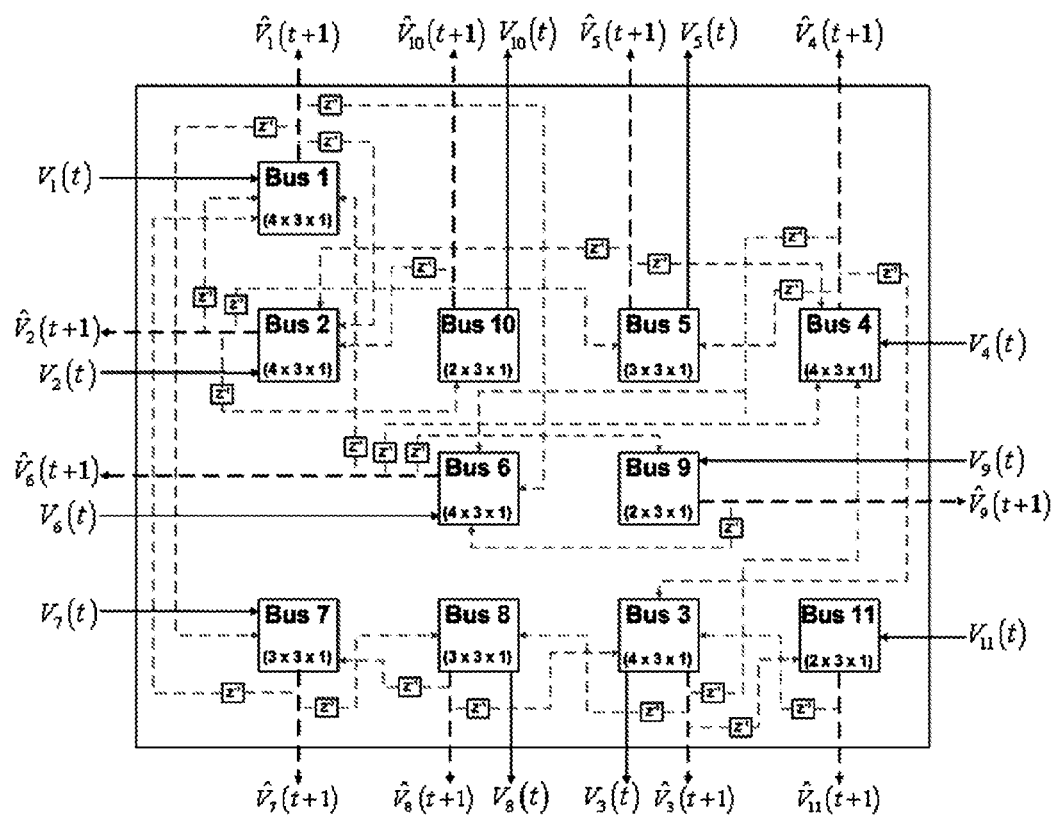
FIG. 5b is a schematic of an electrical power system that can be modeled and controlled by a CCN as used in an embodiment of the invention.

Put another way, each similar variable (speed deviations, voltages, active and reactive power, or other variables) of a component of a power system (generator, bus, FACTS device, or other electrical device in the grid) can be modeled by one of the nine cells shown in FIG. 6. For example, if the output variables of interest (control state information) of the generators (G2, G3 and G4) in FIG. 5*a* are their speed deviations, then FIG. 6 reduces to a CCN layer with 3 cells, correspondingly 3 dimensions. The active interconnections are traced from the topological connections of the generators in FIG. 5*a*. Likewise, if the output variables of interest of Buses 1 to 11 are the bus voltages, then FIG. 6 becomes FIG. 5(*b*).

Figure 7:
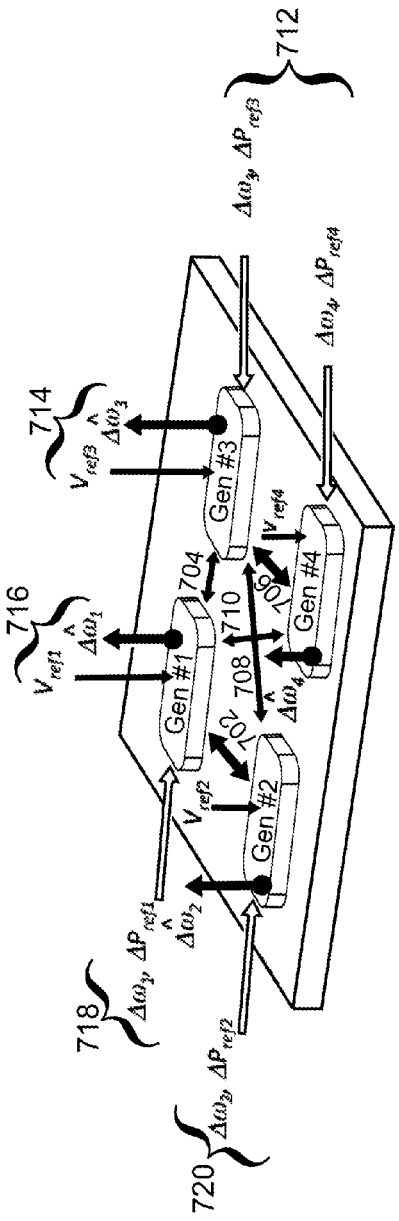
FIG. 7 is a 4-dimensional cellular computational 1 network layer representing the various control state information associated with 4 electrical generators in an electrical power system that can be modeled and controlled in a CCN as used in an embodiment of the invention.

If two variables are of interest, for example for the generators, the speed deviation ($\Delta\omega$) and terminal voltage, a scalable approach would be to be use two layers, one for speed deviation and the other for the terminal voltage (in another bus voltage layer). These two layers can be coupled to each other, as illustrated in FIG. 7, indicating a speed deviation layer of a CCN 700 including four generators (Gen#1, Gen#2, Gen#3, and Gen#4), receiving inputs 702, 704, 706, 708, and 710 from within the layer and 712, 714, 716, 718, and 720 from external layers.

A typical function modeled by a cell can be represented by the following equation:

$$y_{i,\Delta\omega} = f_{\Delta\omega}(\Delta\omega_{i,\omega}, \Delta Pref_{i,\omega}, \Delta\omega_{I,\omega}, Vref_{I,V})$$

where y is the output of the cell, the first two quantities on the right hand side of the equation are of the component ($\Delta\omega_{i,\omega}$, $\Delta Pre\ f_{i,\omega}$), the third quantity is the same variable ($\Delta\omega_{I,\omega}$) of a different component in the same layer of the CCN, and the last quantity is a different variable from a different layer needed to capture the coupled dynamics in the system. For example, the effects of the terminal voltage on the speed deviation are captured through the feedback excitation system reference ($Vref_{I,V}$).

Building the different layers in a CCN like this with coupling in essence models the differential algebraic equations used in modeling power system dynamics. The differential equations model the generator dynamics. The algebraic equations model the network dynamics. For a small power system, the cells can also have two or more outputs, one for each variable. The performance may degrade based on the number of outputs and complexity of the system.

One of the functions of the state estimators in control centers is to update the topology of the system every few seconds, the CCN can automatically implement this based on its active learning from measurements. The active interconnection between the cells has a unit delay, or time-step delay. This may also be replaced by a time calculated based on the time it takes for electrons to flow from one cell to the other. In other words, proportional to transmission line distance. In addition, the influence of the output of a cell connected to other cells can be modulated/weighted. Though interconnections may exist between some cells their influence on each other may be less influential on each other's dynamics, and vice versa. The influence and time delays can be learned for a given system.

Each cell in a CCN can be empowered with any computational algorithm/paradigm desired. It could be simple algebraic and/or differential equation, a neuron, or a neural network (feedforward, feedback—Elman or Jordan networks). When the computational unit/engine of each cell is different, the CCN is referred to as a non-uniform or non-homogeneous CCN.

Having a generalized neuron, a neural network or an equation with coefficients allows for learning/adaptation/tuning to take place. This is important for power systems with its changing dynamics. The cells can be identical or different, and correspondingly the number of parameters to be learned in each cell. Usually, with the CCN structure, these numbers are small. The computational power requirements for each cell are minimal. Thus, scalability is possible.

Learning in each cell can follow a different rule and can happen at different times. If learning takes place using the same rule and at the same time, then the CCN follows homogeneous synchronous learning mechanism. Otherwise, it can heterogeneous and/or asynchronous.

Typical learning rules for neural networks in cells include gradient-descent algorithms, backpropagation, particle swarm optimization, mean-variance optimization and genetic algorithms.

The CCN structure is distributed and thus suitable for parallel implementation. Parallel implementation on a number of processors, perhaps corresponding to the number of cells in each CCN layer, caters for fast implementation and convergence during learning. The CCN in its entirety can be implemented in one location or distributed spatially.

The basic features of a cell in a CCN are its ability to compute, learn and compute. The cells can learn on data to estimate or predict the target variables. The estimation can be time, represented as t. The prediction can be at time t+n$\Delta$T, where $\Delta$T is the sample time and n is the number of time steps, ranging from 0 (estimation), 1, 2, . . . , m, . . . k. $\Delta$T may be different for different power system variables. The ability to push k to greater values and still get good predictions depends on the computational paradigm used in each cell. For multiple values of $\Delta$T and n, recurrent neural networks are preferred.

Several CCN layers can be created to estimate/predict different power system variables (speed deviation, voltages, power flows, etc.). This is referred to as the information layer. Based on the information layer, transient stability margin, voltage stability load index, and other indexes can be computed or learned for a given system. This layer provides knowledge of the system status. The information and knowledge layers can yield outputs at time t or at time t+n$\Delta$T.

Figure 8:
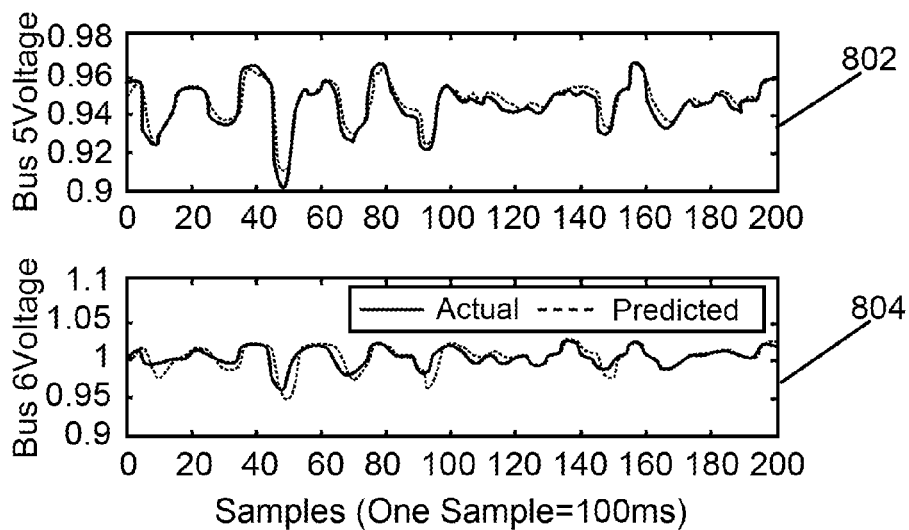
FIG. 8 is a chart of modeling data output from an embodiment of the invention indicating actual and predicted control state information, where predicted control state information for this embodiment is approximately 100 ms ahead of actual.
Figure 8:
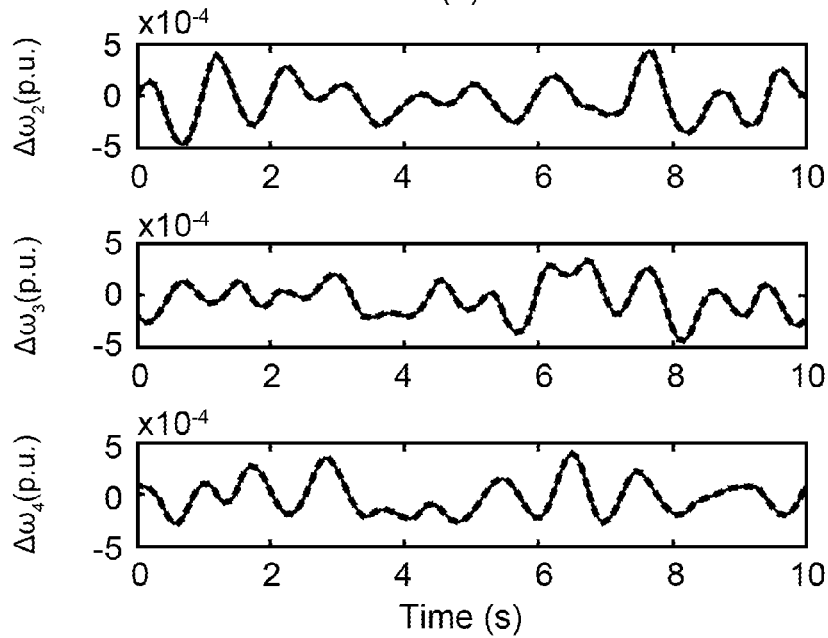

FIG. 8 shows typical results for power system 500 of FIG. 5*a*, modeling Bus 5 voltage 802 and Bus 6 voltage 804 (two different independent CCN layers). Here the predictions are carried out for bus voltages and speed deviations of generators at time t+100 ms, as shown in FIG. 8 illustrating prediction results one-time step ahead (100 ms). Other embodiments of the invention could predict well beyond 100 ms ahead depending upon the criteria used as set forth herein.

When CCN layers provide outputs at t, situational awareness is created/born/provided. When CCN layers provide outputs at t+n$\Delta$T, situational intelligence emerges. For situational intelligence to emerge, state variables plus control variables have to be predicted. Control variables can be either fixed or assumed to adapt based on some known adaptation rule. It is important to foresee the effects of the predicted variables on the controller parameters and its response.

One or more layers (not shown in FIG. 2) can model the controllers (could be adaptive/optimal). This is referred to as the action layer of the CCN.

Put another way, situational intelligence is derived from a virtual power system operation by the CCN began at time t (based on measurements at time t) into a future time t+nΔT. Situational intelligence is derived by the CCN's ability to dream/foresee/project into a sequence of operations happening up to a time t+nΔT. This is possible when the CCN is implemented on a high performance-computing platform.

In other words, having a foresight of the system/control outputs from time t to time t+nΔT happens in a time period less than ΔT. Thus it is possible to carry out contingency analysis for power systems using a CCN to evaluate its security and stability. Because of the prediction capabilities, it is possible to have fewer PMUs in the physical power system and substitute the cells of the CCN as virtual PMUs. The outputs of the different CCN layers (information, knowledge, action and other layers) can be visualized using commercially available control center visualization tools. The resulting effect is full observability of a power system that had otherwise a depth or more of unobservability.

These illustrated examples are offered by way of illustration of the invention's versatility and not meant to limit the invention in any way. The present invention may be embodied in other specific forms without departing from its spirit of essential characteristics. The described embodiments are to be considered in all respects only illustrative and not restrictive. The scope of the invention is, therefore, indicated by the appended claims, rather than by the foregoing description. All changes that come within the meaning and range of equivalency of the claims are to be embraced within their scope.

What is claimed is:

1. An electrical grid monitoring, predictive monitoring, and control system comprising:
    a controller in electrical communication with a multiplicity of electrical devices in an electric grid, wherein said controller receives control state data from each electrical device of said multiplicity of electrical devices indicating a current state of each said electrical device;
    a multi-dimensional, multi-layer cellular computational network (CCN) disposed within said controller comprising:
       an information layer;
       a knowledge layer;
       a decision-making layer; and
       an action layer;
       wherein each said layer of said CCN represents one of a multiplicity of control state variables in the electric grid; and
       wherein each said layer is further comprised of a multiplicity of cells each containing computational algorithms capable of cognitive learning to create a control state model by receiving cellular control state information from one or more cells; and
    wherein said controller analyzes said multiplicity of control state data then determines a current control state, an interim predicted control state, and a final predicted control state for one or more of said multiplicity of electrical devices;
    wherein said interim predicted control state is derived from predicted measurements associated with said multiplicity of control state variables in the electric grid;
    wherein said final predicted control state is derived from a combination of said current control state and one or more interim predicted control states; and
    wherein said controller automatically changes said current state of said one or more of said multiplicity of electrical devices based on the final predicted control state.

2. The electrical grid control system of claim 1 wherein said controller creates a current control state model and a final predicted control state model to indicate the current state and final predicted future state of said one or more of said multiplicity of electrical devices.

3. The electrical grid control system of claim 1 wherein said controller creates a current control state model and a final predicted control state model to indicate the current state and final predicted future state of said electrical grid.

4. The electrical grid control system of claim 1 wherein said controller indicates a recommended action defining a course of action for future control of said electrical grid.

5. The electrical grid control system of claim 4 wherein said controller transmits control information based upon said recommended action to one or more of said multiplicity of electrical devices thereby causing a change in the state of said one or more of said multiplicity of electrical devices.

6. The electrical grid control system of claim 1 wherein said controller calculates a stress of said electrical grid.

7. The electrical grid control system of claim 6 comprising calculation of a final predicted state model from said stress to indicate a final predicted future state of said electrical grid.

8. The electrical grid control system of claim 6 wherein said system provides a dynamic predictive state estimation model to allow for improved detection, identification and removal of bad measurements.

9. The electrical grid control system of claim 6 wherein said controller creates real-time indicators and predictive security indicators.

10. The electrical grid control system of claim 1 wherein said controller creates an optimal predicted control state model from the situational intelligence derived from a multiplicity of possible predicted future states of said one or more of said multiplicity of electrical devices.

11. A method of controlling an electrical grid in a situational awareness/situational intelligence framework comprising the steps of:
    receiving control state information from at least one of a multiplicity of electrical devices disposed within an electrical grid;
    analyzing said control state information in said controller using a multi-dimensional, multi-layer cellular computational network (CCN) disposed within said controller comprising:
       an information layer;
       a knowledge layer;
       a decision-making layer; and
       an action layer;
       wherein each said layer of said CCN represents one of a control state variable of a multiplicity of control state variables in said electric grid; and
       wherein each said layer is further comprised of a multiplicity of cells each containing computational algorithms capable of cognitive learning to create a control state model by receiving cellular control state information from one or more cells; and
    creating an interim predicted control state for at least one of said multiplicity of electrical devices;

creating a final predicted control state for at least one of said multiplicity of electrical devices; and wherein said controller automatically changes said current state of said one or more of said multiplicity of electrical devices based on the final predicted control state.

12. The method of claim 11 further comprising the step of creating a final predicted state model to indicate the future state of said one or more of said multiplicity of electrical devices.

13. The method of claim 11 further comprising the step of creating a final predicted state model to indicate the future state of the electrical grid.

14. The method of claim 11 further comprising the step of creating a recommended action for use in selecting a course of action for future control of the electrical grid.

15. The method of claim 11 further comprising the step of sending updated control state information to one or more of said multiplicity of electrical devices for the purpose of causing a change in the state of said one or more of said multiplicity of electrical devices.

16. The method of claim 11 further comprising the step of lowering the number of phasor measurement units disposed within the electrical grid without degrading said controller's ability to provide full observability of the electrical grid.

17. The method of claim 11 further comprising the step of creating virtual phasor measurement units for use within said CCN.

18. The electrical grid control system of claim 11 wherein said controller creates an optimal predicted control state model from the situational intelligence derived from a multiplicity of possible predicted future states of said one or more of said multiplicity of electrical devices.

19. An electrical grid monitoring and control system containing a situational awareness/situational intelligence framework comprising:
 a controller in electrical communication with a multiplicity of electrical devices in an electrical grid, wherein said controller receives control state information from at least one electrical device in said multiplicity of electrical devices indicating a current state of said at least one electrical device;
 a multi-dimensional, multi-layer cellular computational network (CCN) disposed within said controller comprising:
  an information layer;
  a knowledge layer;
  a decision-making layer; and
  an action layer;
  wherein each said layer of said CCN represents one of a control state variable of a multiplicity of control state variables in said electric grid; and
  wherein each said layer is further comprised of a multiplicity of cells each containing computational algorithms capable of cognitive learning to create a control state model by receiving cellular control state information from another cell;
 wherein said controller analyzes said control state information and said cognitive learning within one or more of said multiplicity of cells, then determines a current control state, an interim predicted control state, and a final predicted control state for one or more of said multiplicity of electrical devices; and
 wherein said controller automatically changes said current state of said one or more of said multiplicity of electrical devices based on the final predicted control state.

20. The electrical grid control system of claim 19 wherein said CCN is capable of coupling one or more of said layers to create a final predicted state model to indicate said final predicted control state of said one or more of said multiplicity of electrical devices.

21. The electrical grid control system of claim 19 wherein said CCN is capable of coupling one or more of said layers to create a final predicted state model to indicate said final predicted control state of said electrical grid.

22. The electrical grid control system of claim 19 wherein said controller calculates the stress of the electrical grid to create a current state model and a final predicted state model to indicate said current control state and said final predicted control state of said electrical grid, wherein said electrical grid comprises renewable generation devices.

23. The electrical grid control system of claim 19 wherein said controller creates an optimal predicted control state model from the situational intelligence derived from a multiplicity of possible predicted future states of said one or more of said multiplicity of electrical devices.

* * * * *